US010223790B2

(12) United States Patent
Kasai et al.

(10) Patent No.: US 10,223,790 B2
(45) Date of Patent: Mar. 5, 2019

(54) DYNAMIC ANALYSIS SYSTEM

(71) Applicant: Konica Minolta, Inc., Chiyoda-ku, Tokyo (JP)

(72) Inventors: Satoshi Kasai, Hachioji (JP); Akinori Tsunomori, Kodaira (JP)

(73) Assignee: KONICA MINOLTA, INC., Tokyo (JP)

( * ) Notice: Subject to any disclaimer, the term of this patent is extended or adjusted under 35 U.S.C. 154(b) by 170 days.

(21) Appl. No.: 15/196,463

(22) Filed: Jun. 29, 2016

(65) Prior Publication Data

US 2018/0005374 A1 Jan. 4, 2018

(51) Int. Cl.

*G06K 9/00* (2006.01)
*G06T 7/00* (2017.01)
*G06T 11/20* (2006.01)

(52) U.S. Cl.

CPC .......... *G06T 7/0014* (2013.01); *G06T 11/206* (2013.01); *G06T 2207/10004* (2013.01); *G06T 2207/30061* (2013.01)

(58) Field of Classification Search

CPC ......... G06T 11/206; G06T 2207/10004; G06T 2207/30061; G06T 7/0014

See application file for complete search history.

(56) References Cited

U.S. PATENT DOCUMENTS

2007/0019849 A1* 1/2007 Kaufman .............. G06F 19/321 382/128
2013/0156267 A1* 6/2013 Muraoka .............. A61B 6/5217 382/103
2016/0217564 A1* 7/2016 Rezaee ................ G06K 9/4604

FOREIGN PATENT DOCUMENTS

JP 2009153678 A 7/2009
JP 2009273671 A 11/2009
WO 2009090894 A1 7/2009

* cited by examiner

*Primary Examiner* — Nirav G Patel
(74) *Attorney, Agent, or Firm* — Cantor Colburn LLP

(57) ABSTRACT

A dynamic analysis system includes a comparing unit and a display unit. The comparing unit extracts a lung field from each of dynamic images obtained by imaging a chest part containing a left lung and a right lung of a subject, specifies a corresponding point in a left part and a corresponding point in a right part of the lung field, and compares characteristic amounts at the respective corresponding points with each other. The display unit displays a result of the comparison made by the comparing unit together with the dynamic images or one of the dynamic images, or displays the result on the dynamic images or the one of the dynamic images.

18 Claims, 10 Drawing Sheets

Mr
Ml
t
Pn

DYNAMIC ANALYSIS SYSTEM

FIELD OF THE INVENTION

The present invention relates to a dynamic analysis system.

DESCRIPTION OF THE RELATED ART

There have been attempts to utilize, for diagnosis, dynamic images of a site which is a target of diagnosis (hereinafter called the "target site") taken with a semiconductor image sensor, such as an FPD (Flat Panel Detector), instead of radiographic (X-ray) still images of the target site taken with a film/screen or a photostimulable phosphor plate.

More specifically, by making use of high responsivity of a semiconductor image sensor in reading/deleting image data, a dynamic state of the target site is imaged by continuously emitting pulsed radiation from a radiation source in sync with timing of image reading/deletion of the semiconductor image sensor and performing imaging multiple times per second. A series of dynamic images obtained by the imaging are displayed in order, so that doctors can observe a series of motions of the target site.

For example, in diagnosis of the lungs, it is important to observe whether there is a part where the pulmonary function (the ventilatory function, the pulmonary blood flow function, etc.) decreases. (Refer to, for example, International Patent Application Publication No. 2009/090894). However, it is not always easy for doctors to recognize abnormal parts in the function by visually observing dynamic images. Accordingly, there has been proposed analyzing dynamic images obtained by imaging and generating diagnostic support information and providing the same to doctors for early diagnosis.

There is described, for example, in Japanese Patent Application Publication No. 2009-273671 imaging the chest part of a subject, dividing the obtained dynamic images at a plurality of time phases into regions, calculating an average signal value as the average value or the like of signal values of pixels contained in each of the divisional regions, obtaining time-series data of the average signal value, calculating an amplitude (i.e., a difference between the maximum value and the minimum value of the average signal value) and a period (i.e., an interval between the time phases of the maximum value to the next maximum value of the average signal value) from the time-series data of the average signal value as characteristic amounts, and determining whether the ventilatory function of the lungs is normal or abnormal based on change in the characteristic amount(s) during each period.

There is described, for example, in Japanese Patent Application Publication No. 2009-153678 imaging the chest part of a subject, calculating an estimated change amount per unit signal change amount from the total signal change amount and the absolute ventilatory volume of, among the obtained dynamic images (see FIG. 13, for example), dynamic images of the maximum expiratory level to the maximum inspiratory level of the lung field R, and, by using a value of the estimated change amount per unit signal change amount, calculating an estimated ventilatory volume in each of the dynamic images from change amounts of signal values from the dynamic images of the maximum expiratory level and the maximum inspiratory level to the other dynamic images.

By the way, the process described in the above-mentioned International Patent Application Publication No. 2009/090894 is performed separately for the left lung and the right lung of a subject captured in dynamic images. However, the present inventors studied and found out that there are abnormalities which cannot be found until the left lung and the right lung captured in dynamic images are compared with each other. In such a case too, so far, it is not always easy for doctors to recognize such abnormalities by visually observing dynamic images, and even if doctors can recognize the abnormalities, they can recognize them only sentiently.

BRIEF SUMMARY OF THE INVENTION

The present invention has been conceived in view of the above problems, and an object thereof is providing a dynamic analysis system which can accurately find abnormalities unrecognizable until the left lung and the right lung of a subject are compared with each other, and can display the abnormalities in such a way that doctors can easily recognize them.

In order to achieve the above object, according to an aspect of preferred embodiments of the present invention, there is provided a dynamic analysis system including: a comparing unit which extracts a lung field from each of dynamic images obtained by imaging a chest part containing a left lung and a right lung of a subject, specifies a corresponding point in a left part and a corresponding point in a right part of the lung field, and compares characteristic amounts at the respective corresponding points with each other; and a display unit which displays a result of the comparison made by the comparing unit together with the dynamic images or one of the dynamic images, or displays the result on the dynamic images or the one of the dynamic images.

The dynamic analysis system of the present invention can accurately find abnormalities unrecognizable until the left lung and the right lung of a subject are compared with each other, and can display the abnormalities in such a way that doctors can easily recognize them.

BRIEF DESCRIPTION OF THE SEVERAL VIEWS OF THE DRAWING

The present invention is fully understood from the detailed description given hereinafter and the accompanying drawings, which are given by way of illustration only and thus are not intended to limit the present invention, wherein:

FIG. 10 shows displaying results of processes in first to fourth configuration examples for anatomical locations in the lungs with marks or the like;

FIG. 11 shows an example of a region of interest or the like provided on the extracted lung field or the like;

DETAILED DESCRIPTION OF THE INVENTION

Hereinafter, an embodiment of the dynamic analysis system of the present invention is described with reference to the drawings.

[Overall Configuration of Dynamic Analysis System]

Figure 1:
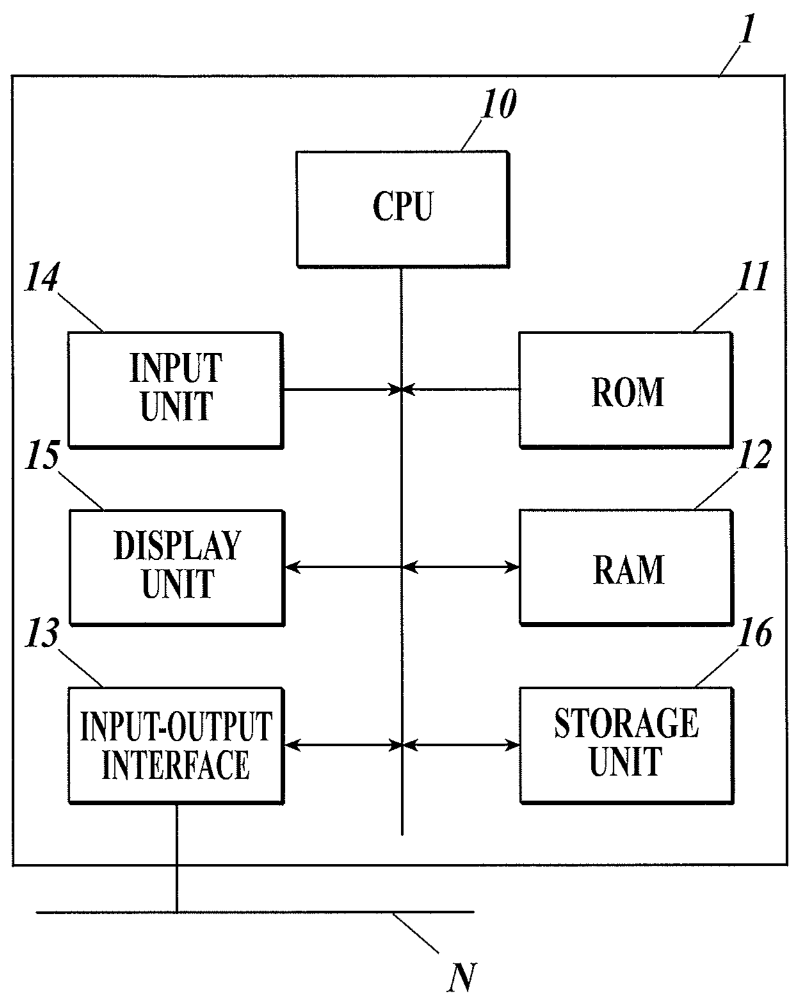
FIG. 1 is a block diagram showing the overall configuration of a dynamic analysis system according to an embodiment of the present invention.

The overall configuration of a dynamic analysis system 1 according to an embodiment of the present invention is described. FIG. 1 is a block diagram showing the overall configuration of the dynamic analysis system of the embodiment. In the embodiment, as shown in FIG. 1, the dynamic analysis system 1 is constituted of a general-use computer which includes a CPU (Central Processing Unit) 10, a ROM (Read Only Memory) 11, a RAM (Random Access Memory) 12 and an input-output interface 13 connected with one another via a bus, and is connected to a network N via the input-output interface 13.

The CPU 10 is also connected with: an input unit 14 constituted of a keyboard, a mouse, a touch panel and/or the like; and a display unit 15 constituted of a CRT (Cathode Ray Tube), an LCD (Liquid Crystal Display) and/or the like. The CPU 10 is also connected with a storage unit 16 constituted of a nonvolatile semiconductor memory, an HDD (Hard Disk Drive) and/or the like.

The dynamic analysis system 1 may be constituted of, not the above-described general-use computer, but a dedicated device. Further, although, in the embodiment, the CPU 10 functions as a comparing unit of the present invention as described below, the comparing unit may be constituted of a unit, a module or the like separate from the CPU 10. Further, the dynamic analysis system 1 may include, in addition to the display unit 15, for example, a sound producing unit, a flashing/lighting unit and a vibration producing unit, and may also include other appropriate units, such as a printing unit.

Although the dynamic analysis system 1 can be configured as a single device as shown in FIG. 1, it may be configured such that the comparing unit and the display unit 15 are separate devices. Thus, the dynamic analysis system 1 is not limited to the one shown in FIG. 1 (i.e., to the one configured as a single device).

Although they are not shown, the dynamic analysis system 1 may include: an imaging device which takes dynamic images; a control device, such as a console, which controls the imaging; an image analysis device which analyzes the taken dynamic images; and a database for image storing which stores the taken images.

In the embodiment, the dynamic analysis system 1 can read, from the database for image storing, dynamic images obtained by imaging the chest part containing the left and right lungs of a subject, and perform image analysis on the read dynamic images, thereby calculating characteristic amounts about the ventilatory function or the pulmonary blood flow function (i.e., the above-described amplitude, period, absolute ventilatory volume, estimated ventilatory volume, etc.), or the dynamic analysis system 1 can make use of the characteristic amounts obtained by an image analysis device separate from the dynamic analysis system 1 performing image analysis in advance. For methods for calculating the characteristic amounts or the like, refer to the above-mentioned International Patent Application Publication No. 2009/090894, Japanese Patent Application Publication No. 2009-273671, Japanese Patent Application Publication No. 2009-153678 and so forth.

Other than the above, as the characteristic amounts, usable are a change amount of density of the lung field, a change amount of the area of the lung field (a motion amount of the contour of the lung field), a movement amount of the diaphragm (a motion amount of the diaphragm), a movement amount of the outer thorax (a motion amount of the outer thorax), a speed of change in the density of the lung field, a speed of change in the area of the lung field, a speed of motion of the diaphragm, a speed of motion of the outer thorax, pulmonary compliance (an indicator showing stretchability of the lungs) and so forth. For these, refer to Japanese Patent Application No. 2016-063125 in which they are described in detail.

In particular, if pulmonary compliance is high, illnesses such as pulmonary emphysema, COPD and cystic lung disease are suspected, whereas if it is low, illnesses such as restrictive lung disease, interstitial pneumonia, pulmonary fibrosis and pulmonary edema are suspected. Thus, pulmonary compliance can be an effective characteristic amount for diagnosis of a variety of illnesses.

As described above, in the embodiment, the CPU 10 of the dynamic analysis system 1 functions as the comparing unit of the present invention. Hereinafter, when the CPU 10 functions as the comparing unit, it is described as a comparing unit 10. The comparing unit 10 extracts the lung field from each of dynamic images obtained by imaging the chest part containing the left and right lungs of a subject, specifies a corresponding point (s) in the left part and a corresponding point(s) in the right part of the lung field, respectively, and compares characteristic amounts at the respective corresponding points with each other.

Figure 3:
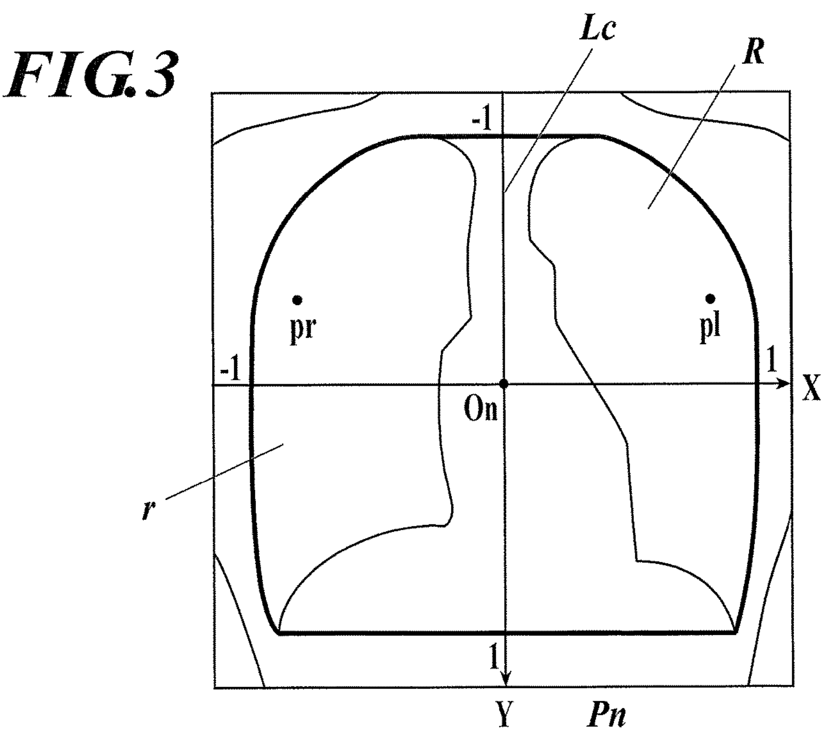
FIG. 3 shows, for example, a normalized coordinate system having the determined center point as the origin.
Figure 6:
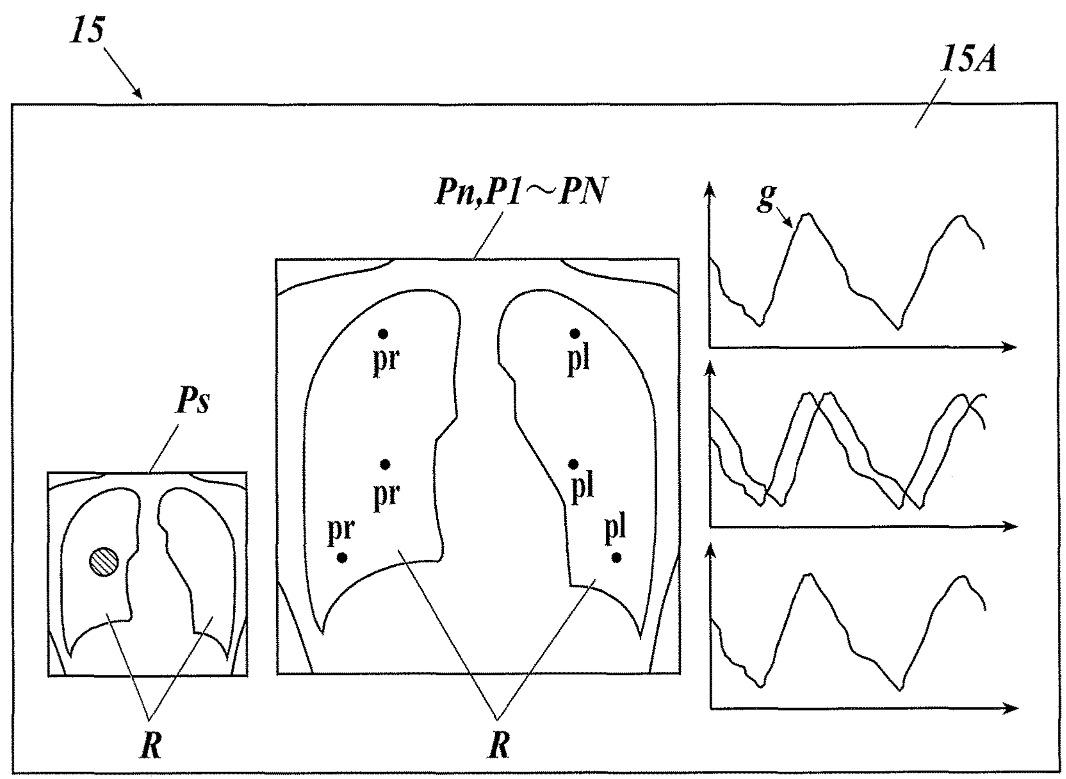
FIG. 6 shows a display example on an image displayed on a display unit.

When the comparing unit 10 specifies a corresponding point(s) pl in the left part and a corresponding point(s) pr in the right part of a lung field R as described below, the display unit 15 displays the corresponding points pl and pr on a plurality of dynamic images P1 to PN or on one dynamic image Pn of the dynamic images as shown in FIG. 3, FIG. 6 and so forth described below, for example. The display unit 15 displays the comparison result(s) made by the comparing unit 10 together with each of the dynamic images or one of the dynamic images or displays the comparison result(s) on the dynamic images or one of the dynamic images.

Hereinafter, first, an example of how the comparing unit 10 sets the corresponding points is described, and then a display process performed by the display unit 15 is described in detail with some configuration examples. Further, operation of the dynamic analysis system 1 of the embodiment is also described. Hereinafter, a case where N dynamic images are taken by one imaging is described, and each dynamic image is represented by Pn (n=1 to N).

[Example of how Comparing Unit Sets Corresponding Points]

Figure 2A:
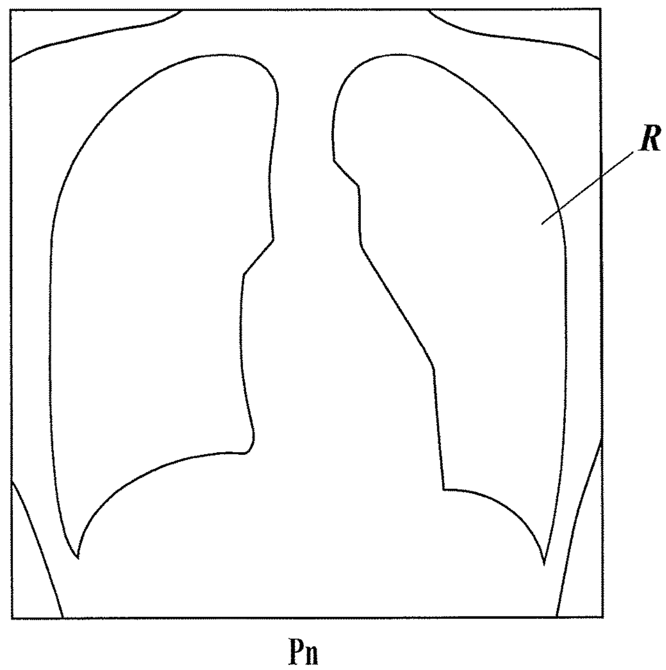
FIG. 2A shows a lung field extracted from each dynamic image Pn.

In the embodiment, the comparing unit 10 obtains, from the database for image storing or the like, a plurality of dynamic images Pn (see FIG. 13, for example) obtained by imaging, and, as shown in FIG. 2A, extracts the lung field R from each dynamic image Pn. The comparing unit 10 can perform the process on each dynamic image Pn from which all or some of the heart, diaphragm and centrums have been removed as shown in FIG. 2A.

Then, for each dynamic image, the comparing unit 10 determines a centerline Lc of the extracted lung field R, and specifies points having the same distance from the determined centerline Lc to the left and to the right (i.e., points symmetrical about the centerline Lc), respectively, as corresponding points in the left part and the right part of the lung field R, respectively. More specifically, as shown in FIG. 2B, the comparing unit 10 specifies one approximately bell-shaped region r containing the extracted lung field R of the left and right lungs, and determines a center point On of the specified region r.

Figure 2B:
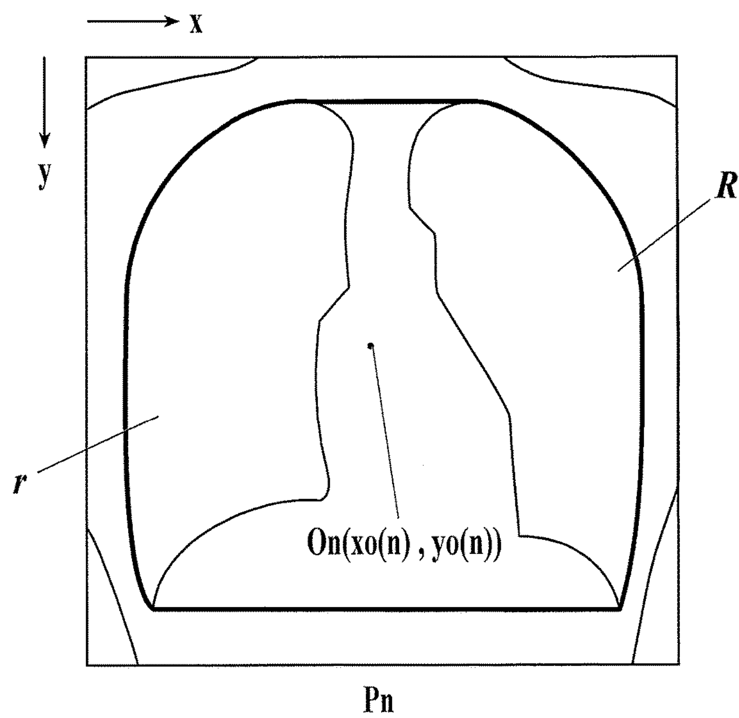
FIG. 2B shows, for example, a center point of the lung field determined for each dynamic image Pn.

As shown in FIG. 2B, if the horizontal axis and the vertical axis of each dynamic image Pn are represented by an x axis and a y axis, respectively, and pixels are each represented by (x,y), the comparing unit 10 can determine, as the center point On, a point (xo(n),yo(n)) wherein xo(n) represents the x coordinate of the midpoint of (i) the x coordinate of the left end and (ii) the x coordinate of the right end of the region r, and yo(n) represents the y coordinate of the midpoint of (i) the y coordinate of the upper end and (ii) the y coordinate of the lower end of the region r, for example. As the y coordinate of the center point On, the y coordinate of the midpoint of (i) the y coordinate of the lung apex part and (ii) the y coordinate of the lung base part may be determined, for example.

Then, as shown in FIG. 3, the comparing unit 10 sets a normalized coordinate system in which the determined center point On is the origin, and the horizontal axis and the vertical axis are the X axis and the Y axis, respectively. In this case, the Y axis corresponds to the centerline Lc. The comparing unit 10 can specify, in the coordinate system, points pl and pr having the same Y coordinate but an X coordinate of opposite sign as the corresponding points.

In this case, in the normalized coordinate system, the center point On (i.e., the origin) has coordinates (0,0), and, for example, if one of the corresponding points, pl, has coordinates (−0.8, −0.4), the other thereof, pr, has coordinates (0.8, −0.4). The above configuration makes the corresponding points pl and pr have the same distance to the left and to the right from the centerline Lc (the Y axis, in this case), respectively.

The comparing unit 10 performs the process to specify the corresponding point pl or pr for each of all the pixels belonging to the extracted lung field R. This respect will be described below. Among the pixels belonging to the extracted lung field R, pixels to which their respective corresponding points cannot be found are excluded from the target of the below-described process.

Figure 13:
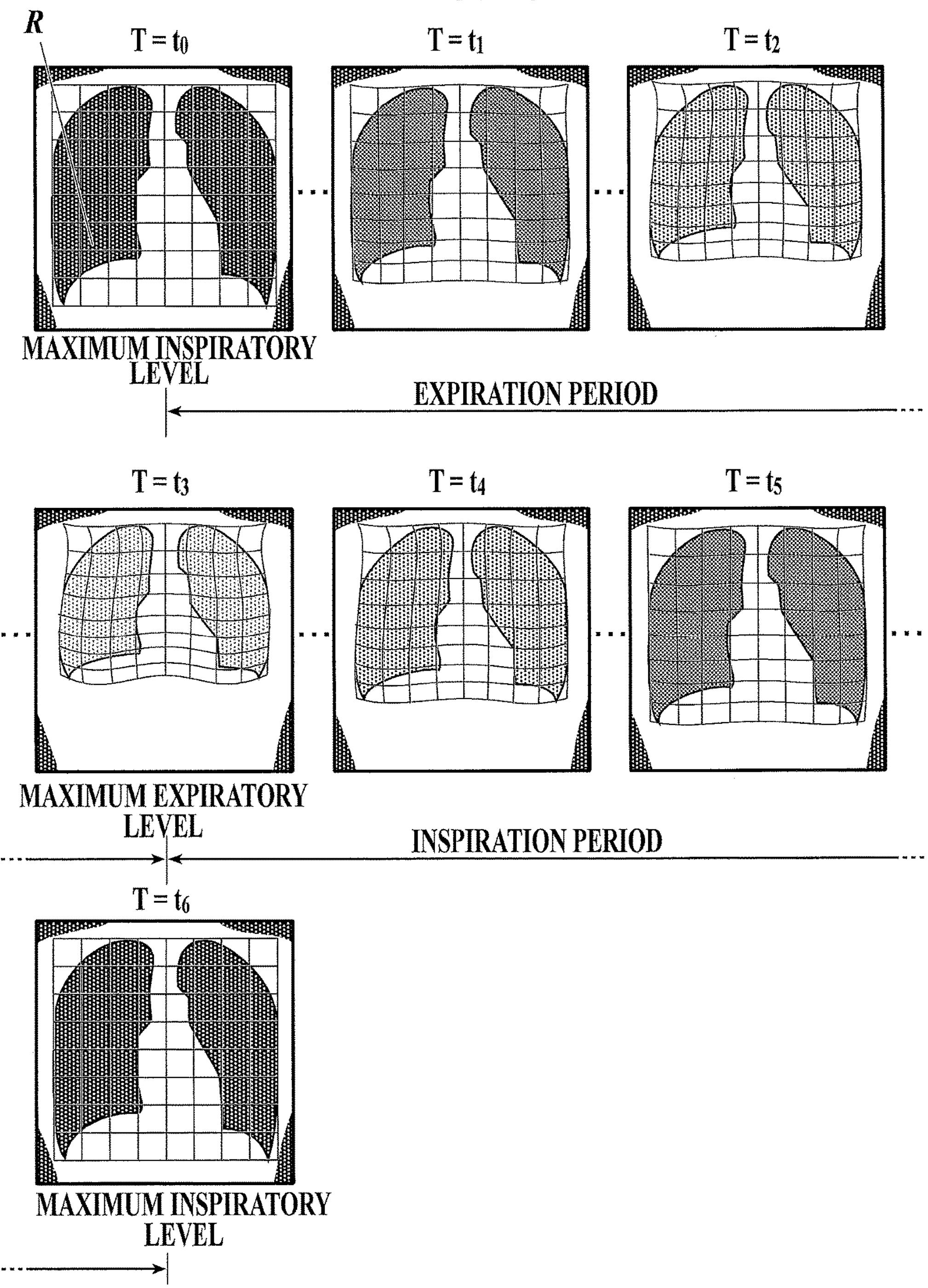
FIG. 13 shows dynamic images or the like obtained by imaging the chest part of a subject.

By the way, although it is not always necessary to set the above-described normalized coordinate system, when the above-described normalized coordinate system is set for each dynamic image Pn, as shown in FIG. 13, the corresponding points pl and pr respectively expressed by the same coordinates (e.g., (−0.8, −0.4) and (0.8, −0.4)) in the normalized coordinate systems of the dynamic images Pn (i.e., the dynamic images P1, P2, . . . , PN) move through the images in the up-down direction as the positions of the left lung and right lungs in the dynamic images P1, P2, . . . move up and down on the whole.

The present inventors have studied and found out that, at the time described above, the corresponding point pl tracks anatomically the same location in the left lung relatively well and moves up and down through the images accordingly, whereas the corresponding point pr tracks anatomically the same location in the right lung relatively well and moves up and down through the images accordingly. Hence, when the normalized coordinate systems are set on the dynamic images P1, P2, . . . , and the corresponding points pl and pr are specified therein as described above, the characteristic amounts at the corresponding points pl and pr show (time shifts of) the characteristic amounts at anatomically the same locations in the left and right lungs relatively well, respectively.

This respect will be described below. Hereinafter, the characteristic amount(s) at the corresponding point(s) pl is represented by Cl, the characteristic amount(s) at the corresponding point(s) pr is represented by Cr, and the characteristic amount(s) without distinction between the left lung and the right lung is represented by C. Further, instead of setting the center point and the coordinate system for each dynamic image Pn as described above, the center point and the coordinate system set for the dynamic image Pn at the maximum inspiratory level (see T=t0 in FIG. 13, for example) may be used for the other dynamic images Pn, for example.

When specifies the corresponding points pl and pr in the left part and the right part of the extracted lung field R in each dynamic image Pn, the comparing unit 10 determines the characteristic amounts Cl and Cr at the corresponding points pl and pr and compares them with each other. If the characteristic amounts C about the above-described ventilatory function, pulmonary blood flow function, pulmonary compliance and/or the like are already calculated by another image analysis device, the comparing unit 10 makes use of the characteristic amounts C, whereas if the characteristic amounts C are not calculated yet, the comparing unit 10 itself calculates the characteristic amounts C.

[Comparison Process by Comparing Unit and Display Process by Display Unit]

Hereinafter, the comparison process by the comparing unit 10 and the display process by the display unit 15 are described in detail with some configuration examples.

[First Configuration Example]

The present inventors have studied and obtained knowledge that if no illness or lesion is present in the lungs, corresponding parts in the left and right lungs move or function in the same manner, namely, if the lungs are normal, the characteristic amounts Cl and Cr at the left and right corresponding points pl and pr in the lung field R are approximately the same value.

Figure 4:
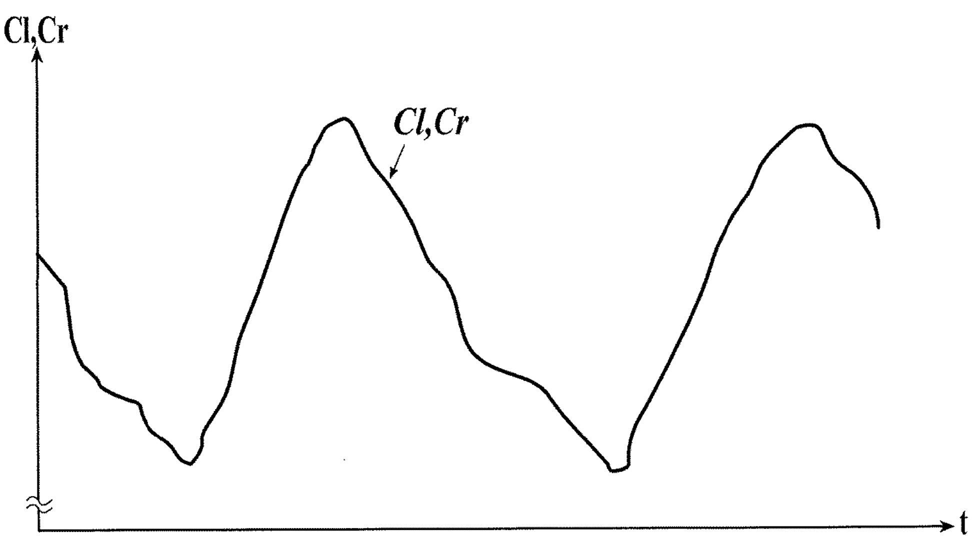
FIG. 4 shows a graph showing time shifts of characteristic amounts at corresponding points at which the lungs are normal.

Hence, for example, if no illnesses or lesions are present at anatomical locations or in the vicinities thereof in the left and right lungs corresponding to the corresponding points pl and pr in the dynamic images P1 to PN, time shifts of the characteristic amounts Cl and Cr at the corresponding points pl and pr are usually approximately the same, as shown in, for example, FIG. 4 in which the calculated characteristic amounts Cl and Cr at the corresponding points pl and pr in the dynamic images Pn are plotted in order of the dynamic images Pn, namely, with the passage of time t. That is, the characteristic amounts Cl and Cr for corresponding parts in the left and right lungs generally change in the same manner in terms of time.

Figure 5A:
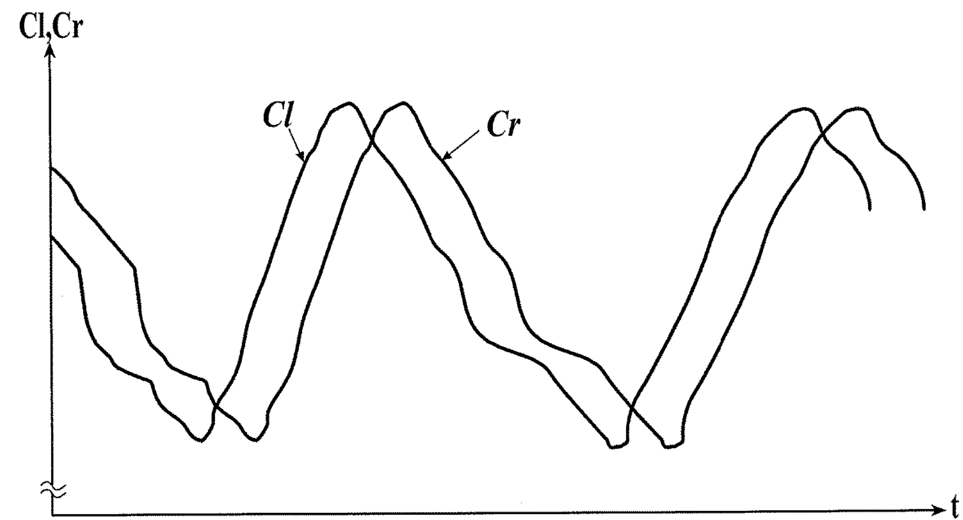
FIG. 5A shows a graph showing a case where the characteristic amount at the corresponding point in the right lung changes in a delayed fashion.
Figure 5B:
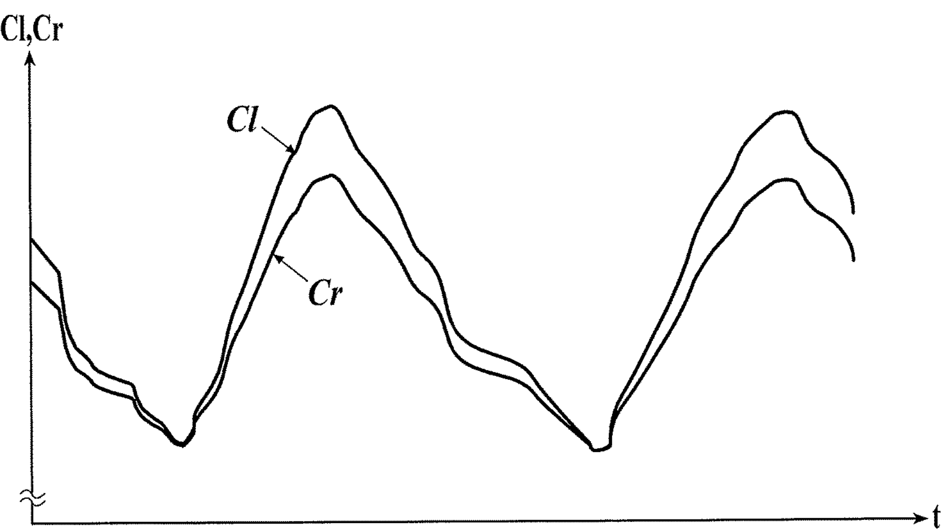
FIG. 5B shows a graph showing a case where magnitude of temporal change in the characteristic amount at the corresponding point in the right lung is smaller.

However, if an abnormality is present, for example, at a part of the right lung, as illustrated in FIG. 5A for example, the characteristic amount Cr at the corresponding point pr in the right lung changes in a delayed fashion, namely, later than the characteristic amount Cl at the corresponding point pl in the normal left lung changes, or as illustrated in FIG. 5B for example, magnitude (amplitude) of temporal change in the characteristic amount Cr at the corresponding point pr in the right lung is smaller than magnitude of temporal change in the characteristic amount Cl at the corresponding point pl in the normal left lung.

Accordingly, as shown in FIG. 4, FIG. 5A and FIG. 5B, the comparing unit 10 creates a graph g in which the characteristic amounts Cl and Cr at the corresponding points pl and pr are plotted with the time t on the horizontal axis. The time t may be plotted on the vertical axis. Then, as shown in FIG. 6 for example, the display unit 15 can display one dynamic image Pn or display the dynamic images P1 to PN as a moving image on a display screen 15A, and also display one graph created by the comparing unit 10 as described above or display a plurality of graphs created thereby in such a way that the graphs are aligned in terms of the passage of the time t, for example.

This configuration makes it recognizable with a single sight, for which position (i.e., for which corresponding points pl and pr) in the lung field R, the graph g shows a possible abnormality, and makes it possible to display possible abnormalities which cannot be found until the left lung and the right lung of a subject are compared with each other, in such a way that doctors can easily recognize them.

The corresponding points pl and pr (or one of these) for which the graph is to be displayed can be specified by a doctor or the like touching the display screen 15A or moving a cursor on the display screen 15A, or can be automatically selected on the lung field R by the display unit 15, for example. The display unit 15 displays the graph g for the specified or selected corresponding points pl and pr on the display screen 15A.

The display unit 15 may automatically change, on the lung field R, the corresponding points pl and pr for which the graph g is displayed to others in a predetermined order, and, in response to the change, automatically switches the displayed graph g to another.

Further, if, on the lung field R, there is a part where the corresponding points pl or pr for which the graphs g created by the comparing unit 10 show possible abnormalities (see FIG. 5A and FIG. 5B, for example) gather, as shown in FIG. 6 for example, the display unit 15 may display a sub-image Ps on the display screen 15A and display the part in color or the like in the sub-image Ps (see an oblique-line part in FIG. 6), for example, so that doctors can recognize it with a single sight.

[Second Configuration Example]

As described above, if the lungs are normal, the characteristic amounts Cl and Cr at the left and right corresponding points pl and pr in the lung field R are approximately the same value. Hence, for example, as expressed by the following formulae (1) and (2), when differences ΔCl and ΔCr each between the characteristic amounts Cl and Cr at the corresponding points pl and pr (i.e., the difference between the characteristic amount at one of the corresponding points and the characteristic amount at the other thereof) are calculated, the differences ΔCl and ΔCr are both approximately 0.

$$\Delta Cl = Cl - Cr \tag{1}$$

$$\Delta Cr = Cr - Cl \tag{2}$$

However, if an abnormality is present in the left lung or the right lung, as shown in FIG. 5A and FIG. 5B for example, the differences ΔCl and ΔCr each between the characteristic amounts Cl and Cr at the corresponding points pl and pr at a certain time t become a positive value and a negative value, or vise versa, respectively, which are significantly different from 0. In such a case where the differences ΔCl and ΔCr calculated as described above are not 0, the display unit 15 displaying marks indicating that the differences ΔCl and ΔCr are not 0 on the corresponding points pl and pr in the dynamic image Pn when displaying the dynamic image Pn lets doctors recognize that the locations for the corresponding points pl and pr have a possible abnormality.

For example, for each dynamic image Pn, the comparing unit 10 calculates the differences ΔCl and ΔCr each between the characteristic amounts Cl and Cr at the corresponding points pl and pr by the above formulae (1) and (2), and when it is determined that the increase amounts ΔCl and ΔCr calculated by the comparing unit 10 are abnormal (i.e., the absolute value of each of the differences ΔCl and ΔCr is equal to or more than a predetermined threshold value, for example), the display unit 15 can display predetermined marks on the parts of the corresponding points pl and pr of each dynamic image Pn having the differences ΔCl and ΔCr determined to be abnormal in such away as to be laid on the dynamic image Pn while displaying the dynamic images P1 to PN on the display screen 15A as a moving image.

Figure 7:
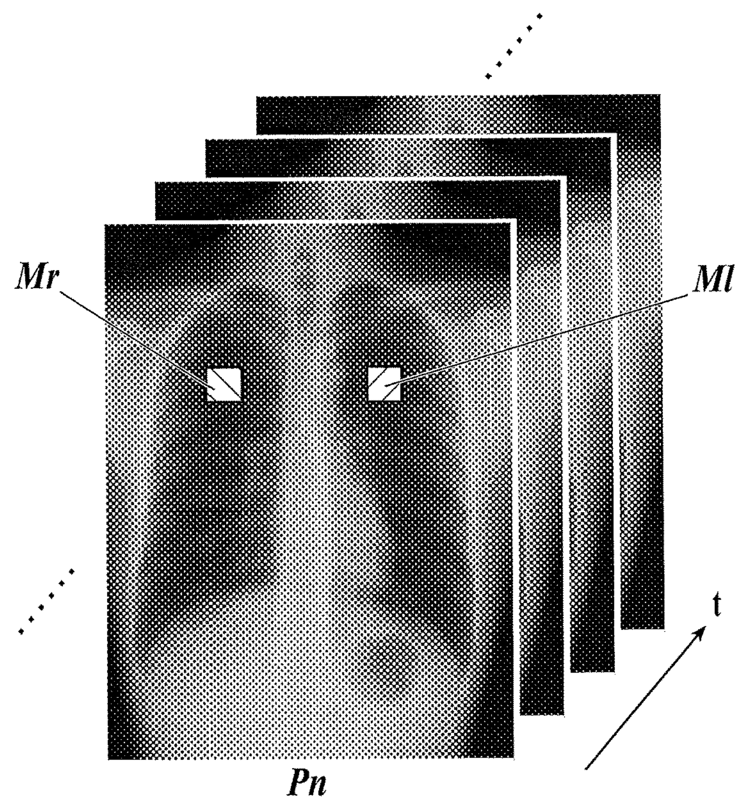
FIG. 7 shows, when performing moving-image display, displaying predetermined marks on the parts of the corresponding points in each dynamic image having a difference determined to be abnormal.

That is, as shown in FIG. 7, the display unit 15 can display predetermined marks Ml and Mr on the parts of the corresponding points pl and pr in each dynamic image Pn having the differences ΔCl and ΔCr determined to be abnormal in such a way as to be laid on the dynamic image Pn while displaying the dynamic images P1 to PN as a moving image. In FIG. 7, as the predetermined marks Ml and Mr, square marks are displayed as examples.

Figure 8:
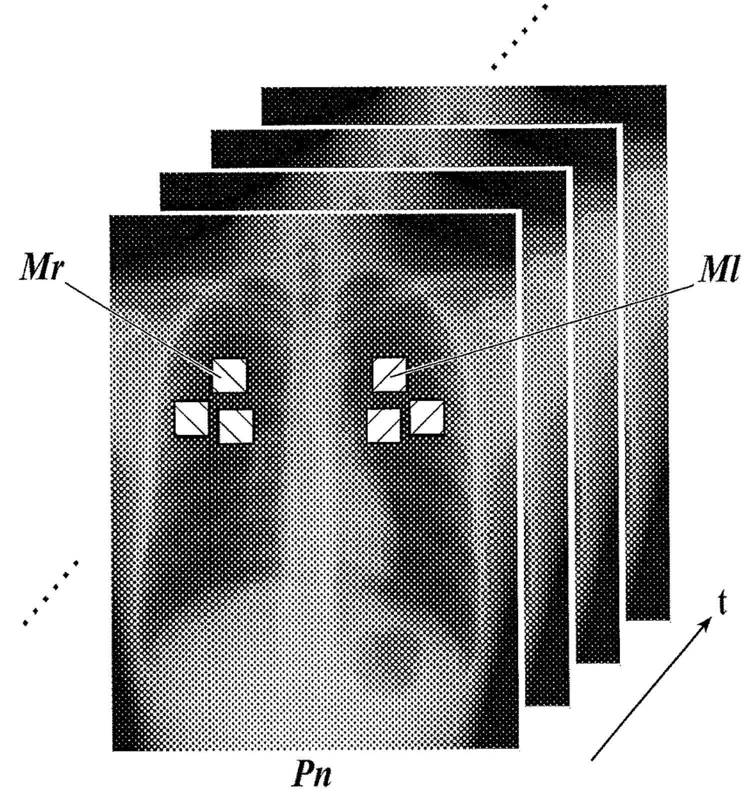
FIG. 8 shows, when performing moving-image display, displaying predetermined marks on the parts of all the corresponding points each pair of which has a predetermined difference between the left characteristic amount and the right characteristic amount, for example.

If, for example, the difference ΔCl (or difference ΔCr) is a positive value, the mark Ml (or mark Mr) may be displayed in a predetermined color (e.g., yellow). On the contrary, if the difference ΔCl (or difference ΔCr) is a negative value, the mark Ml (or mark Mr) may be displayed in a predetermined color (e.g., blue). In FIG. 7, FIG. 8 and so forth described below, the color difference is expressed by changing the direction of oblique lines in the mark Ml and the mark Mr.

Not only when the characteristic amounts Cl and Cr at the corresponding points pl and pr are different from each other as described above, but also when, for example, the difference between the characteristic amounts Cl or Cr at the corresponding point pl or pr in the dynamic images Pn (i.e., a timewise changing rate of the characteristic amounts Cl or Cr at the corresponding point pl or pr) differs between the left lung and the right lung (i.e., between the left corresponding point pl and the right corresponding point pr), the locations for the corresponding points pl and pr have a possible abnormality.

Also, when, for example, the difference between the characteristic amount Cl at the corresponding point pl and the characteristic amount(s) Cl at its surrounding (or neighboring) pixel(s) is different from the difference between the characteristic amount Cr at the corresponding point pr and the characteristic amount(s) Cr at its surrounding (or neighboring) pixel(s), namely, the difference in the left lung is different from that in the right lung (i.e., the difference about the left corresponding point pl is different from that about the right corresponding point pr), the locations for the corresponding points pl and pr have a possible abnormality.

Thus, the comparing unit 10 can calculate not only the differences ΔCl and ΔCr between the characteristic amounts Cl and Cr at the corresponding points pl and pr but also the difference (s) between the values calculated based on the characteristic amounts Cl and Cr at the corresponding points pl and pr. Then, the display unit 15 can display the predetermined marks Ml and Mr on the parts of the corresponding points pl and pr in each dynamic image Pn having the difference(s) between the values determined to be abnormal in such a way as to be laid on the dynamic image Pn while displaying the dynamic images P1 to PN on the display screen 15A as a moving image.

In the above case, when attention is paid to certain corresponding points pl and pr in the dynamic images P1 to PN, the marks Ml and/or Mr appear in a certain dynamic image(s), but do not appear in the other dynamic image(s). That is, when attention is paid to certain corresponding points pl and pr, the marks Ml and Mr are displayed in such a way as to appear or disappear depending on the dynamic image.

The above configuration makes it possible to display the possibility that the locations in the lungs for the corresponding points pl and pr on which the marks Ml and Mr are displayed have an abnormality, in such a way that the possibility can be easily grasped, and makes it recognizable with a single sight, which parts (i.e., which corresponding points pl and pr) in the lung field R at which timing show a possible abnormality, and makes it possible to display abnormalities which cannot be found until the left lung and the right lung of a subject are compared with each other, in such a way that doctors can easily recognize them.

Hereinafter, description is made about the case where the differences ΔCl and ΔCr between the characteristic amounts Cl and Cr at the corresponding points pl and pr are calculated, and the marks Ml and Mr are displayed based thereon. The same description is applicable to the case where the difference (s) between the values calculated based on the characteristic amounts Cl and Cr at the corresponding points pl and pr are calculated, and the marks Ml and Mr are displayed based thereon.

Further, hereinafter, as described above, the description is made about the case where the differences ΔCl and ΔCr between the characteristic amounts Cl and Cr at the corresponding points pl and pr are calculated or the case where the difference(s) between the values calculated based on the characteristic amounts Cl and Cr at the corresponding points pl and pr are calculated. However, the degree of dissimilarity between the characteristic amounts Cl and Cr at the corresponding points pl and pr or between the values calculated based on the characteristic amounts Cl and Cr at the corresponding points pl and pr can be expressed by using, other than the above-described difference(s), a ratio thereof (e.g., Cl/Cr), for example.

Accordingly, the description about the difference between the characteristic amounts or between the values calculated based on the characteristic amounts in this specification is applicable to the case where the ratio or the like is used as the degree of dissimilarity. For example, "if the difference ΔCl (or difference ΔCr) is a positive value" and "if the difference ΔCl (or difference ΔCr) is a negative value" in the above configuration example are read as "if the ratio Cl/Cr (or ratio Cr/Cl) is more than 1" and "if the ratio Cl/Cr (or ratio Cr/Cl) is less than 1", respectively, when the ratio is used as the degree of dissimilarity.

[Third Configuration Example]

In the above second configuration example, while the dynamic images P1 to PN are displayed as a moving image, the marks Ml and Mr are displayed on the corresponding points pl and pr specified by a doctor or automatically selected by the display unit 15, for example. However, as shown in FIG. 8 for example, the marks Ml and Mr may be displayed, in each dynamic image Pn, on all the corresponding points pl and pr each pair of which has a predetermined difference between the characteristic amounts Cl and Cr or between the value calculated based thereon.

This configuration makes it recognizable with a single sight, where in the lung field R at which timing shows a possible abnormality, or where in the lung field R such parts appear concentratedly, and makes it possible to display abnormalities which cannot be found until the left lung and the right lung of a subject are compared with each other, in such a way that doctors can easily recognize them.

In the above second and third configuration examples (see FIG. 7 and FIG. 8), while the dynamic images P1 to PN are displayed on the display screen 15A as a moving image, the predetermined marks are displayed on the parts of the corresponding points pl and pr of one pair or a plurality of pairs of the dynamic image Pn having the differences ΔCl and ΔCr determined to be abnormal in such a way as to be laid on the dynamic image Pn. Other than this, for example, although it is not shown, while the dynamic images Pn having the differences ΔCl and ΔCr determined to be abnormal are displayed one by one in a still-image manner, namely, as still images, the predetermined marks may be displayed on the parts of the corresponding points pl and pr of one pair or a plurality of pairs of each of those dynamic images Pn in such a way as to be laid on the dynamic image Pn.

[Fourth Configuration Example]

Figure 9A:
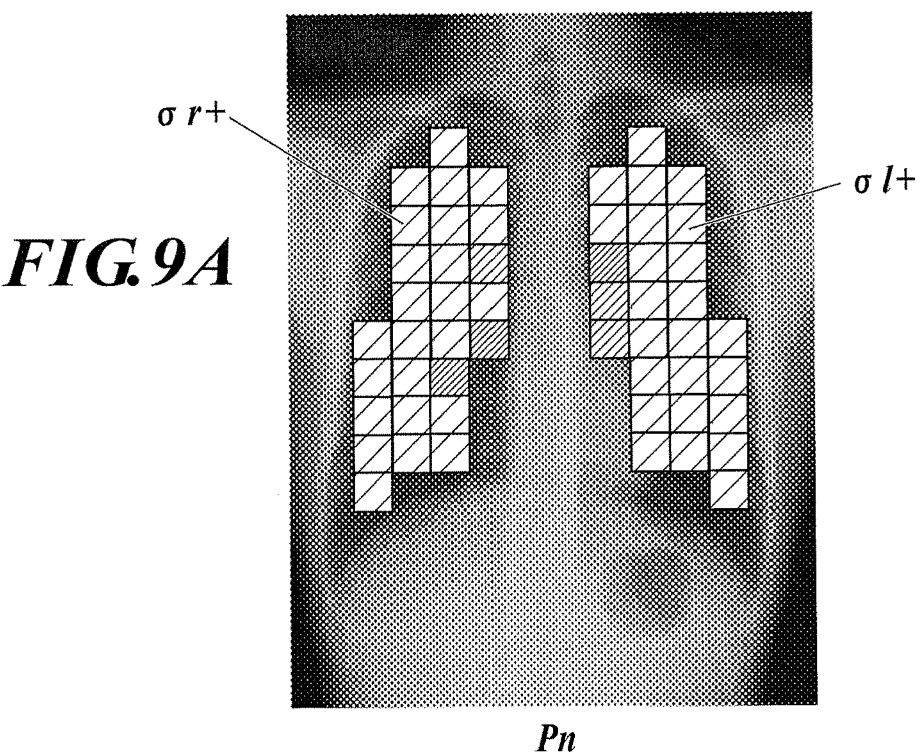
FIG. 9A shows displaying the total value obtained by tallying positive differences of the difference between the characteristic amounts at the corresponding points calculated for each of the dynamic images with respect to each of the corresponding points.
Figure 9B:
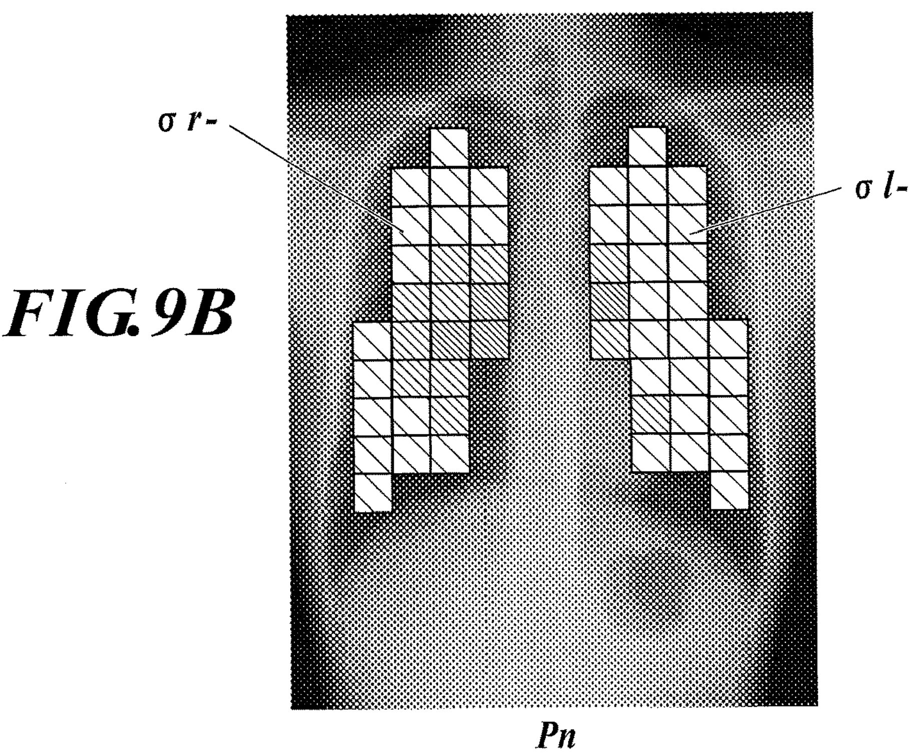
FIG. 9B shows displaying the total value obtained by tallying negative differences of the difference between the characteristic amounts at the corresponding points calculated for each of the dynamic images with respect to each of the corresponding points.

Further, it is possible that the comparing unit 10 calculates, for each dynamic image Pn, the differences ΔCl and ΔCr each between the characteristic amounts Cl and Cr at the corresponding points pl and pr as described above, and the display unit 15 separately tallies positive differences of the difference ΔCl, positive differences of the difference ΔCr, negative differences of the difference ΔCl and negative differences of the difference ΔCr of all the dynamic images P1 to PN with respect to each of the corresponding points pl and pr, and, as shown in FIG. 9A and FIG. 9B, displays the positions of the corresponding points pl and pr of the dynamic images Pn in a mode according to the total values σl+, σr+ (values obtained by tallying positive differences, see FIG. 9A), σl− and σr− (values obtained by tallying negative differences, see FIG. 9B).

The mode according to the total values is, for example, performing the display by changing density of a color or changing colors according to the magnitude of the absolute value of each of the total values σl+, σl−, σr+ and σr−.

This configuration makes it recognizable with a single sight, where in the lung field R shows a possible abnormality, and makes it possible to display abnormalities which cannot be found until the left lung and the right lung of a subject are compared with each other, in such a way that doctors can easily recognize them.

Figure 10:
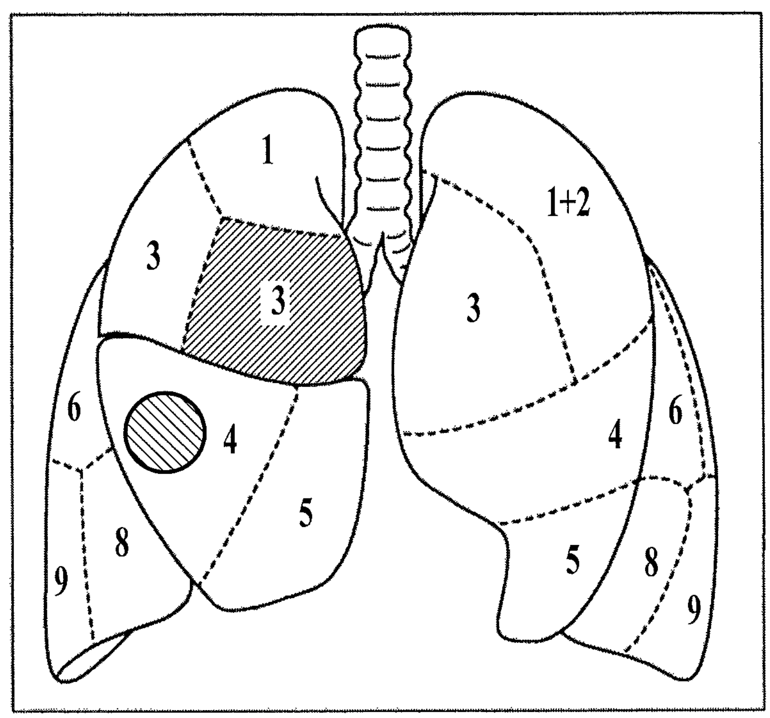

In the above first to fourth configuration examples, instead of displaying the marks or the like on the dynamic image Pn (or dynamic images P1 to PN), it is possible to determine to which anatomical location in the lungs, a position in the dynamic image Pn correspond, and, as shown in FIG. 10 for example, to display a mark or the like on the anatomical location in the lungs or display the anatomical structure concerned (e.g., a pulmonary lobe) in the lungs in color.

This configuration makes it visually graspable, to which part of the actual lungs, the position, on the dynamic image Pn, showing a possible abnormality corresponds. This contributes to doctors' diagnosis.

[Advantageous Effects]

As described above, according to the dynamic analysis system 1 of the embodiment, the comparing unit 10 extracts the lung field R from each of the dynamic images P1 to PN obtained by imaging the chest part containing the left and right lungs of a subject, and compares the characteristic amounts Cl and Cr at the left and right corresponding points pl and pr in the lung field R with each other, and the display unit 15 displays the result(s) while displaying the dynamic images P1 to PN as a moving image or displays the result(s) on one dynamic image Pn, for example.

Hence, according to the embodiment, the dynamic analysis system 1 can automatically and accurately find abnormalities (illnesses, lesions, etc.) even if they are ones which cannot be found until the left lung and the right lung of a subject are compared with each other, and can display the abnormalities in such a way that doctors can easily recognize them, and also can show the abnormalities quantitatively which doctors have so far been able to recognize only sentiently.

In the above embodiment, the dynamic images Pn from which the heart, diaphragm and centrums have been removed are processed. Alternatively, restored dynamic images Pn may be processed, for example. The restored dynamic images Pn are the dynamic images Pn from which components of the heart, diaphragm and centrums have been extracted and these components have been removed, and thereby in which image components of the lung parts captured on the heart, diaphragm and centrums have been restored.

[How to Specify Corresponding Points]

In the above embodiment, the comparing unit 10 performs the process to specify the corresponding point pl or pr (see FIG. 3) for each of all the pixels belonging to the extracted lung field R, but may perform the process, for example, only for each of predetermined points (e.g., points each having coordinates expressed by (0.1×k, 0.1×m) wherein k and m are integers) in the normalized coordinate system.

Figure 11:
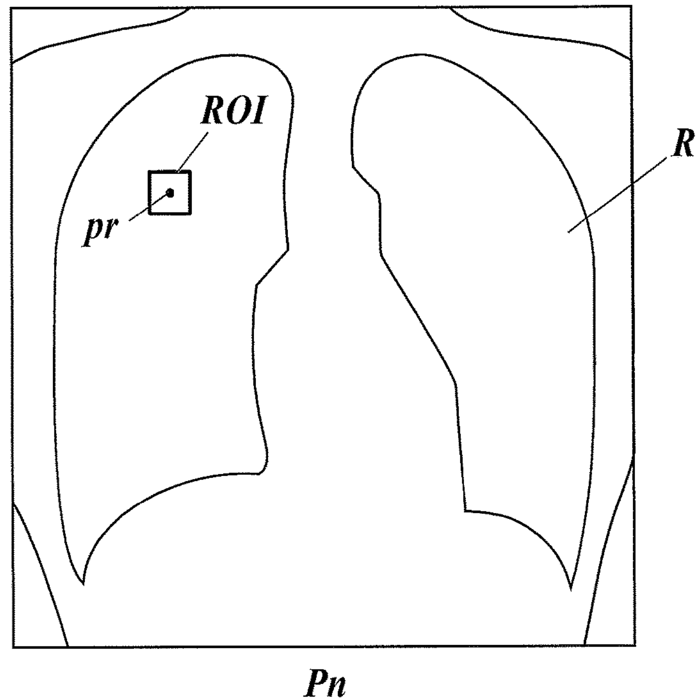

Further, as shown in FIG. 11 for example, a region of interest ROI may be provided on the extracted lung field R or on the normalized coordinate system, and a representative point of the region of interest ROI (e.g., the center of the region of interest ROI) may be specified as the corresponding point pr or the like. Then, the above-described process can be performed, taking the average value or the like of the characteristic amounts C at respective points contained in the region of interest ROI as the characteristic amount Cr or the like at the corresponding point pr or the like.

This configuration can reduce the load of the process to specify the corresponding points pl and pr performed by the comparing unit 10 as compared with the case where the process is performed for each of all the pixels belonging to the extracted lung field R.

[Tracking of Corresponding Points Through Dynamic Images]

In the above embodiment, as described above, the normalized coordinate system is set in the dynamic image Pn, and points respectively having the same coordinates in the dynamic images P1 to PN are specified as the corresponding points pl and pr, respectively, so that the corresponding points pl and Pr track anatomically the same location in the left lung and the same location in the right lung relatively well, respectively. However, the configuration described below makes it possible that the corresponding points pl and pr in the dynamic images Pn more accurately track anatomically the same location in the left lung and the same location in the right lung, respectively.

That is, for example, as shown in FIG. 13, it is possible to set, among a plurality of dynamic images, for example, the dynamic image at the maximum inspiratory level (in FIG. 13, the dynamic image at T=t0) as a reference image, divide a region containing the lung field R into small rectangular regions (each corresponding to the region of interest), perform local matching and/or warping (nonlinear distortion transformation described, for example, in Japanese Patent Application Publication No. 2012-5729) on the reference image with the other dynamic images Pn; and track the regions of interest through the dynamic images, thereby tracking the corresponding points therethrough.

Figure 12:
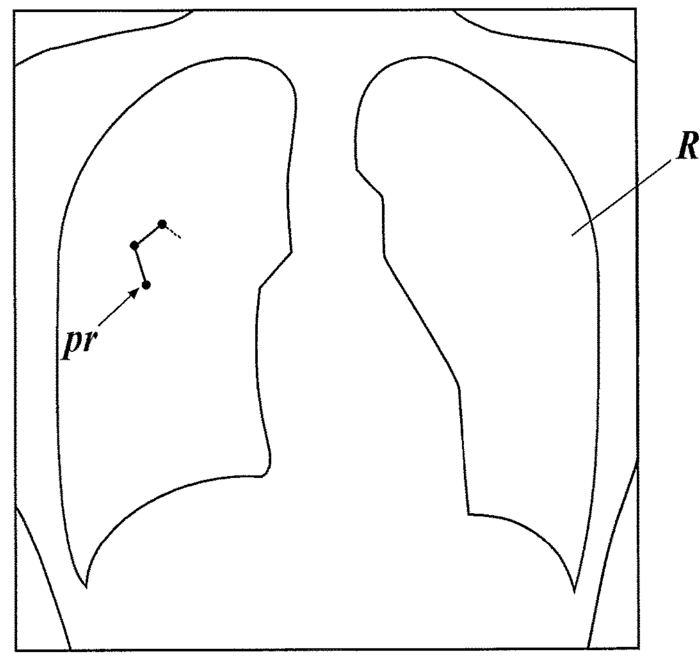
FIG. 12 shows tracking the corresponding point(s) through the dynamic images.

Further, for example, as shown in FIG. 12, it is possible to first specify the corresponding point pr (or corresponding point pl) in the dynamic image P1, then specify, in the next dynamic image, P2, a pattern of a small region most similar to a pattern of a small region (not shown) containing the corresponding point pr (or corresponding point pl) in the dynamic image P1, and specify the corresponding point pr (or corresponding point pl) in the dynamic image P2, and repeat this process for each of the dynamic images Pn, thereby tracking the corresponding point pr (or corresponding point pl) through the dynamic images Pn and specifying the corresponding point pr (or corresponding point pl) in each of the dynamic images Pn.

In this case, for example, each time the corresponding point pr (or corresponding point pl) is specified in a dynamic image Pn as described above, a point symmetrical about the above-described centerline Lc of the lung field R may be specified as the corresponding point pl (or corresponding point pr).

Alternatively, for example, points symmetrical about the centerline Lc of the lung field R may be specified in the dynamic image P1 as the corresponding points pl and pr, and the corresponding point pl and the corresponding point pr may be tracked separately through the following dynamic images Pn as described above.

This configuration makes it possible to determine and specify the corresponding points pl and pr in each of the dynamic images Pn more precisely and makes it possible to exhibit the effects of the dynamic analysis system 1 of the embodiment more appropriately.

Needless to say, the present invention is not limited to the above embodiment or the like and can be appropriately modified without departing from the spirit of the present invention.

What is claimed is:

1. A dynamic analysis system comprising:

a comparing unit which extracts a lung field from each of dynamic images obtained by imaging a chest part containing a left lung and a right lung of a subject, specifies a corresponding point in a left part and a corresponding point in a right part of the lung field, and compares characteristic amounts at the respective corresponding points with each other; and a display unit which displays a result of the comparison made by the comparing unit together with the dynamic images or one of the dynamic images, or displays the result on the dynamic images or the one of the dynamic images;

wherein the comparing unit creates a graph in which the characteristic amounts at the respective corresponding points are plotted with time on one axis, and the display unit displays the dynamic images as a moving image or displays the one of the dynamic images, and also displays one or more of the graph created by the comparing unit.

2. The dynamic analysis system according to claim 1, wherein the display unit displays the corresponding points on the dynamic images or the one of the dynamic images.

3. The dynamic analysis system according to claim 1, wherein the comparing unit tracks the respective corresponding points through the dynamic images and specifies the corresponding points in each of the dynamic images, and creates the graph in which the characteristic amounts at the respective corresponding points are plotted with the time on the one axis, and the display unit displays the graph for the specified corresponding points.

4. The dynamic analysis system according to claim 1, wherein the comparing unit calculates, for each of the dynamic images, a degree of dissimilarity between (i) the characteristic amount or a value calculated based on the characteristic amount at one of the corresponding points and (ii) the characteristic amount or a value calculated based on the characteristic amount at other of the corresponding points.

5. The dynamic analysis system according to claim 1, wherein the comparing unit calculates, for each of the dynamic images, a difference between (i) the characteristic amount or a value calculated based on the characteristic amount at one of the corresponding points and (ii) the characteristic amount or a value calculated based on the characteristic amount at other of the corresponding points, and the display unit tallies a positive of the difference of all the dynamic images with respect to each of the corresponding points, tallies a negative of the difference of all the dynamic images with respect to each of the corresponding points, and displays a position of each of the corresponding points of the dynamic images in a mode according to a value obtained by the tallying.

6. The dynamic analysis system according to claim 1, wherein the comparing unit calculates, for each of the dynamic images, a ratio of (i) the characteristic amount or a value calculated based on the characteristic amount at one of the corresponding points to (ii) the characteristic amount or a value calculated based on the characteristic amount at other of the corresponding points, and the display unit tallies a value being more than 1 of the ratio of all the dynamic images with respect to each of the corresponding points, tallies a value being less than 1 of the ratio of all the dynamic images with respect to each of the corresponding points, and displays a position of each of the corresponding points of the dynamic images in a mode according to a value obtained by the tallying.

7. The dynamic analysis system according to claim 1, wherein, for each of the dynamic images, the comparing unit determines a centerline of the extracted lung field, and specifies points having a same distance to left and to right from the determined centerline, respectively, as the respective corresponding points.

8. The dynamic analysis system according to claim 1, wherein, for each of the dynamic images, the comparing unit determines a center point of a region containing the extracted lung field, sets a normalized coordinate system having the determined center point as an origin, and specifies points symmetrical about a vertical axis passing through the center point as the respective corresponding points.

9. The dynamic analysis system according to claim 1, wherein the comparing unit, for a predetermined dynamic image among the dynamic images, determines a centerline of the extracted lung field, and specifies points having a same distance to left and to right from the determined centerline, respectively, as the respective corresponding points, and for a rest of the dynamic images, uses the determined centerline, and specifies points having the same distance to the left and to the right from the determined centerline, respectively, as the respective corresponding points.

10. The dynamic analysis system according to claim 1, wherein, for each of the dynamic image, the comparing unit sets a region of interest and specifies a representative point of the region of interest as one of the corresponding points.

11. The dynamic analysis system according to claim 1, wherein the comparing unit tracks the respective corresponding points through the dynamic images and specifies the corresponding points in each of the dynamic images.

12. The dynamic analysis system according to claim 11, wherein the comparing unit sets the one of the dynamic images as a reference image, performs local matching and/or warping on the reference image with a rest of the dynamic images, and tracks the respective corresponding points through the dynamic images.

13. The dynamic analysis system according to claim 1, wherein the comparing unit processes the dynamic images from which one or more portions of a heart, a diaphragm and a centrum have been removed.

14. The dynamic analysis system according to claim 4, wherein if the degree of dissimilarity calculated by the comparing unit is determined to be abnormal, the display unit performs a process to display a predetermined mark on a part of each of the corresponding points of a dynamic image among the dynamic images, the dynamic image having the degree of dissimilarity determined to be abnormal, while displaying the dynamic images as a moving image or displaying the dynamic image having the degree of dissimilarity determined to be abnormal as a still image.

15. The dynamic analysis system according to claim 1, wherein the corresponding points are symmetrical about a centerline of the extracted lung field.

16. A dynamic analysis system comprising:

a comparing unit which extracts a lung field from each of dynamic images obtained by imaging a chest part containing a left lung and a right lung of a subject, specifies a corresponding point in a left part and a corresponding point in a right part of the lung field, and compares characteristic amounts at the respective corresponding points with each other; and a display unit which displays a result of the comparison made by the comparing unit together with the dynamic images or one of the dynamic images, or displays the result on the dynamic images or the one of the dynamic images;

wherein the comparing unit processes the dynamic images from which one or more portions of a heart, a diaphragm and a centrum have been removed;

wherein the comparing unit creates a graph in which the characteristic amounts at the respective corresponding points are plotted with time on one axis, and the display unit displays the dynamic images as a moving image or displays the one of the dynamic images, and also displays one or more of the graph created by the comparing unit.

17. A dynamic analysis system comprising:

a comparing unit which extracts a lung field from each of dynamic images obtained by imaging a chest part containing a left lung and a right lung of a subject, specifies a corresponding point in a left part and a corresponding point in a right part of the lung field, and compares characteristic amounts at the respective corresponding points with each other; and a display unit which displays a result of the comparison made by the comparing unit together with the dynamic images or one of the dynamic images, or displays the result on the dynamic images or the one of the dynamic images;

wherein the comparing unit calculates, for each of the dynamic images, a degree of dissimilarity between (i) the characteristic amount or a value calculated based on the characteristic amount at one of the corresponding points and (ii) the characteristic amount or a value calculated based on the characteristic amount at other of the corresponding points.

18. A dynamic analysis system comprising:

a comparing unit which extracts a lung field from each of dynamic images obtained by imaging a chest part containing a left lung and a right lung of a subject, specifies a corresponding point in a left part and a corresponding point in a right part of the lung field, and compares characteristic amounts at the respective corresponding points with each other; and a display unit which displays a result of the comparison made by the comparing unit together with the dynamic images or one of the dynamic images, or displays the result on the dynamic images or the one of the dynamic images;

wherein the comparing unit calculates, for each of the dynamic images, a difference between (i) the characteristic amount or a value calculated based on the characteristic amount at one of the corresponding points and (ii) the characteristic amount or a value calculated based on the characteristic amount at other of the corresponding points, and the display unit tallies a positive of the difference of all the dynamic images with respect to each of the corresponding points, tallies a negative of the difference of all the dynamic images with respect to each of the corresponding points, and displays a position of each of the corresponding points of the dynamic images in a mode according to a value obtained by the tallying.

* * * * *